(12) United States Patent
Roberts et al.

(10) Patent No.: US 8,052,871 B2
(45) Date of Patent: Nov. 8, 2011

(54) UNDERDRAIN SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 1533 days.

(21) Appl. No.: 11/119,907

(22) Filed: May 3, 2005

(65) Prior Publication Data
US 2005/0194302 A1 Sep. 8, 2005

Related U.S. Application Data

(63) Continuation-in-part of application No. 10/400,575, filed on Mar. 28, 2003, now Pat. No. 6,991,723, which is a continuation-in-part of application No. 09/948,798, filed on Sep. 10, 2001, now Pat. No. 6,982,034.

(51) Int. Cl.
*B01D 24/24* (2006.01)

(52) U.S. Cl. .......................................... 210/293; 210/489

(58) Field of Classification Search .................. 210/164, 210/291, 293, 455, 483, 488, 489, 498, 499
See application file for complete search history.

(56) References Cited

U.S. PATENT DOCUMENTS

| | | | |
|---|---|---|---|
| 1,151,313 A | 8/1915 | Wheeler | |
| 1,770,830 A * | 7/1930 | Barbour | 210/293 |
| 3,685,657 A | 8/1972 | Hunter et al. | |
| 3,716,144 A * | 2/1973 | Bartlow | 210/499 |
| 4,579,659 A | 4/1986 | Eads et al. | |
| 4,619,765 A | 10/1986 | Roberts | |
| 5,019,259 A | 5/1991 | Hambley | |
| 5,068,034 A | 11/1991 | Walter | |
| 5,108,627 A | 4/1992 | Berkebile et al. | |
| 5,149,427 A | 9/1992 | Brown | |
| 5,269,920 A | 12/1993 | Brown et al. | |
| 5,328,608 A | 7/1994 | Bergmann et al. | |
| 5,462,664 A | 10/1995 | Neuspiel | |
| 5,489,388 A | 2/1996 | Brown et al. | |
| 5,618,426 A | 4/1997 | Eischen et al. | |

(Continued)

FOREIGN PATENT DOCUMENTS

| | | |
|---|---|---|
| EP | 0507414 A | 10/1992 |
| FR | 541011 | 7/1922 |

OTHER PUBLICATIONS

"Water Marks," pp. 1 and 2; Jan. 1995.

(Continued)

*Primary Examiner* — Matthew Savage
(74) *Attorney, Agent, or Firm* — Merek, Blackmon & Voorhees, LLC

(57) ABSTRACT

An underdrain system for a filter having filter media. The underdrain system preferably includes a bottom formed of concrete having a plurality of generally cone-shaped depressions formed therein. Fluid flows through the plurality of generally cone-shaped depressions during filtration and washing. The underdrain system further includes a fluid distributor operably associated with at least one of the generally cone-shaped depressions. The fluid distributor preferably has a plurality of elongated slots for distributing the flow of fluid passing into and out of the generally cone-shaped depressions. The slots are sized to prevent filter media supported by the fluid distributor from passing therethrough. An optional insert may be provided to ensure even distribution of fluid through the fluid distributor.

7 Claims, 7 Drawing Sheets

U.S. PATENT DOCUMENTS

| | | |
|---|---|---|
| 5,639,384 A | 6/1997 | Brown et al. |
| 5,865,999 A | 2/1999 | Shea et al. |
| 6,190,568 B1 | 2/2001 | Hunkele |
| 6,325,931 B1 | 12/2001 | Roberts et al. |
| 6,569,327 B2 | 5/2003 | Roberts et al. |
| 6,615,469 B1 | 9/2003 | Burcham |
| 2003/0047502 A1 | 3/2003 | Roberts et al. |
| 2004/0031743 A1 | 2/2004 | Roberts et al. |

OTHER PUBLICATIONS

"Retroliner™ Rehabilitation System for Monolithic Wheeler Underdrains Product Specifications." pp. 1 and 2.

"Gravity Filter Underdrain," Jan. 1981.

"Infinity Continuous Lateral Underdrain" 1999.

Technical Bulletin No. 700.2 dated Apr. 1973, pp. 1 through 12 and Enlarged Drawing of Microwedge Strainer.

"PWI Wheeler Bottom System" 2003.

WO 99/47232, Method for Using a Gravity Filter, Sep. 23, 1999.

WO 97/40907, Fluid Treatment Media Support System, Nov. 6, 1997.

English language translation of Apr. 6, 2005 Office Action issued in Ecuadorian Patent Application No. SP 02-4313, Apr. 2005.

* cited by examiner

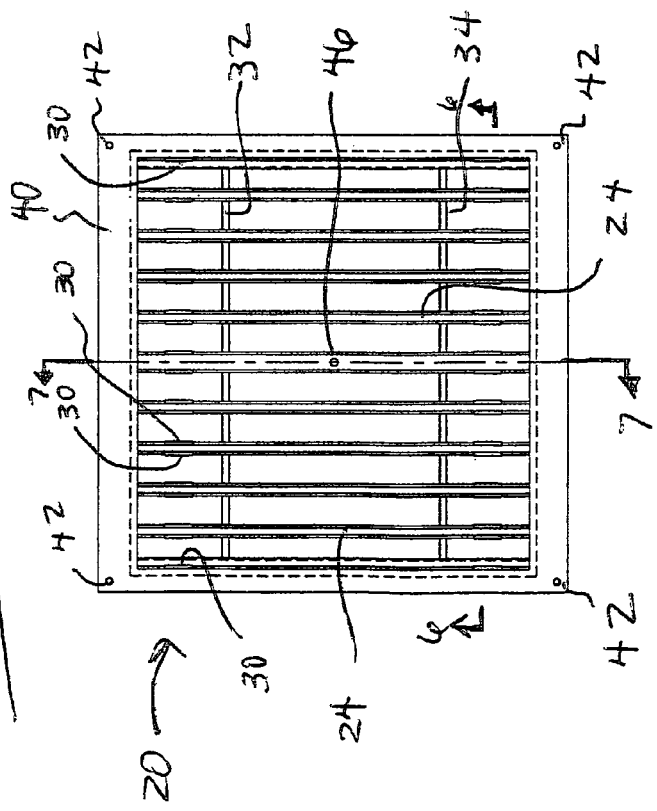

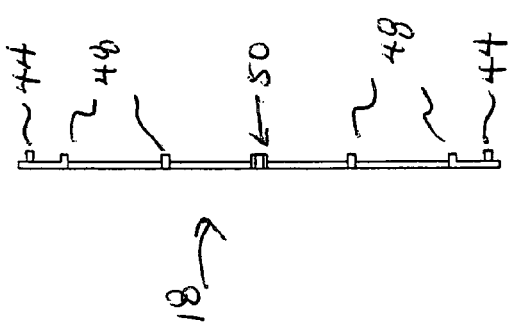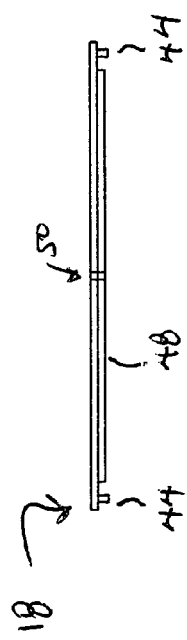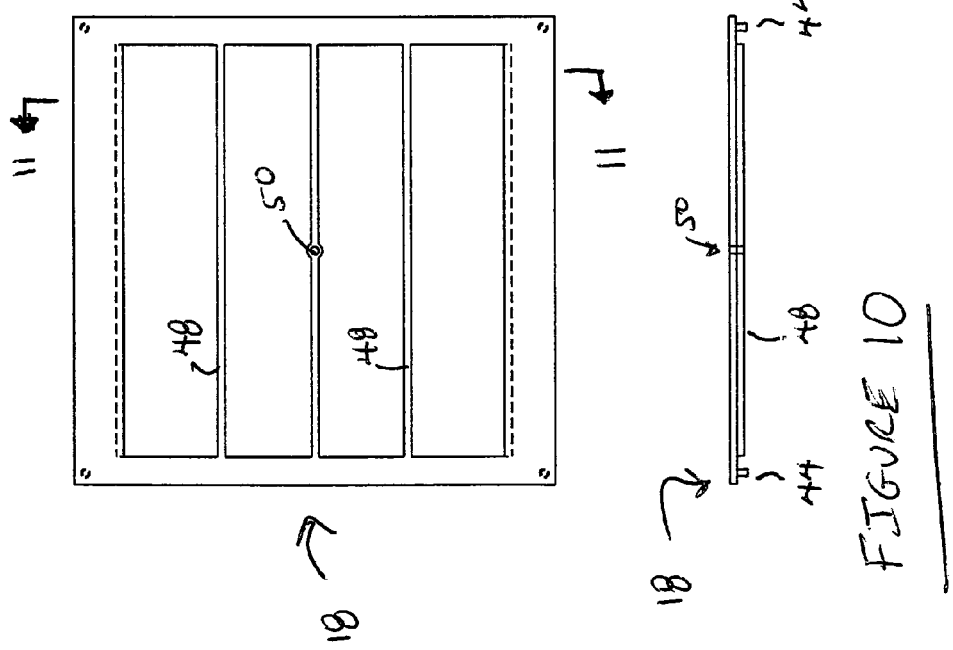

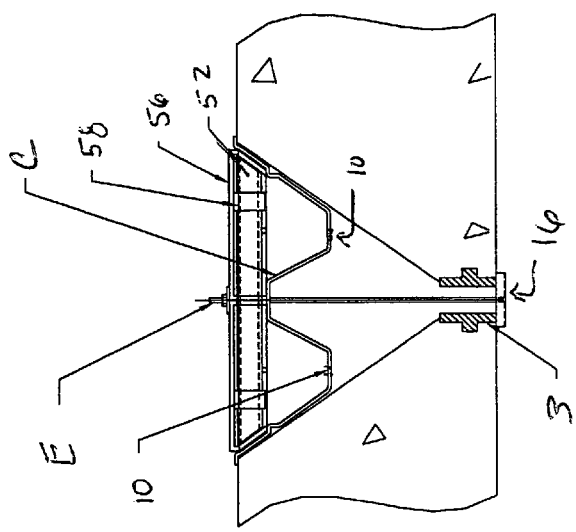
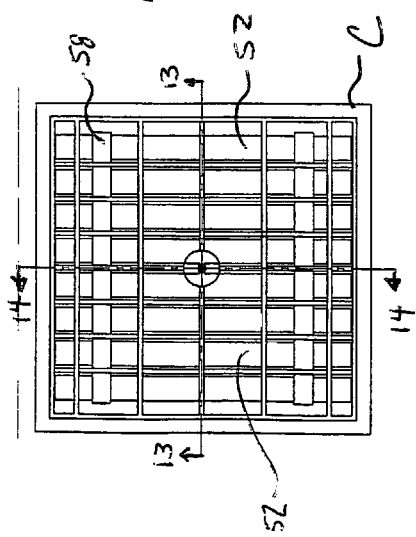
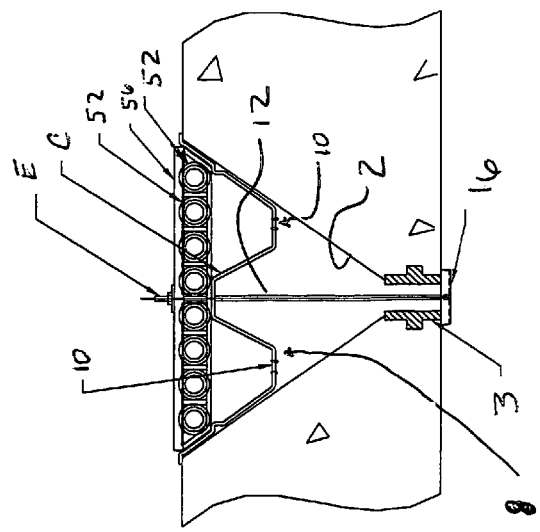

UNDERDRAIN SYSTEM

RELATED APPLICATIONS

The subject patent application is a continuation-in-part of U.S. patent application Ser. No. 10/400,575 filed on Mar. 28, 2003, now U.S. Pat. No. 6,991,723 which is a continuation-in-part of U.S. patent application Ser. No. 09/948,798 filed on Sep. 10, 2001, now U.S. Pat. No. 6,982,034. The entire contents of U.S. patent application Ser. No. 10/400,575 and U.S. patent application Ser. No. 09/948,798 are incorporated herein by reference.

FIELD OF THE INVENTION

The present invention is directed to significant improvements to underdrain systems generally and in particular false bottom (e.g., pre-cast and/or monolithic) underdrain systems that are used in filter systems for filtering water or wastewater.

BACKGROUND OF THE INVENTION

Various underdrain systems have been developed for filter systems that filter water and wastewater. One commonly used underdrain system is a monolithic false bottom underdrain system. This underdrain system typically includes a cast in place concrete structure that overlays the structural floor or true bottom of the filter housing or compartment. The concrete structure includes a plurality of cone-shaped depressions formed herein. "Cone-shaped" as used herein includes within its definition pyramidal shaped depressions. A thimble is disposed at the lowermost point of the cone-shaped depressions. Fluid flows through the thimble and corresponding cone-shaped depressions during the various cycles of operation of a filter including the filtration mode and backwashing mode. Fourteen porcelain spheres are commonly disposed in each of the cone-shaped depressions. Five of the porcelain spheres are approximately 3 inches in size, one of the porcelain spheres is approximately 1 ⅜ inches in size and the eight remaining porcelain spheres are approximately 1¼ inches in size. One of the 3 inch porcelain spheres is disposed directly over a porcelain thimble positioned in the bottom of the cone-shaped depressions. The remaining four 3 inch balls are disposed directly above the porcelain sphere positioned over the thimble. The 1⅜ inch porcelain sphere is located in the center of the four 3 inch porcelain spheres. The remaining eight 1¼ inch porcelain spheres are positioned on the outer periphery of the four 3 inch porcelain spheres. The porcelain balls are expensive and time-consuming to install. Further, it is important to insure that the balls are spherical to insure that the balls do not spin owing to the flow of water passing the balls. This spinning can cause undue wear on the walls of the depressions. The porcelain balls are also subject to becoming dislodged from the corresponding depression. This can lead to significant problems with the operation of the filter.

Another commonly employed underdrain system is a pre-cast wheeler bottom. This type of underdrain system is typically shipped in blocks of specific sizes such as 2'×2' as opposed to a monolithic false bottom underdrain system as previously described. The pre-cast blocks are positioned on concrete walls in the filter housing or compartment. A plurality of depressions are formed in the pre-cast blocks. A plurality of porcelain spheres are disposed in each of the depressions. This underdrain system suffers from similar drawbacks to the monolithic false bottom underdrain systems.

A pyramidal shaped liner has been employed in the depressions of the concrete bottoms where the walls have deteriorated. However, this pyramidal shaped liner formed from plastic only addressed the structural deficiency of the walls and still required the use of numerous porcelain spheres or balls.

U.S. Pat. No. 6,190,568 discloses retrofitting a monolithic false bottom filter underdrain system by replacing the porcelain balls with one or more porous plates. The primary if not exclusive reason for substituting the porcelain balls with a porous plate stated in U.S. Pat. No. 6,190,568 is to obviate one or more gravel support layers that are sometimes used with monolithic false bottom underdrain systems. The porous plates are permanently anchored to the concrete bottom of the monolithic false bottom underdrain system. Specifically, U.S. Pat. No. 6,190,568 teaches permanently anchoring the porous plates to the concrete bottom by embedding an anchor in the concrete bottom.

There are numerous disadvantages to the retrofit underdrain system disclosed in U.S. Pat. No. 6,190,568. One principal disadvantage is that the porcelain balls are replaced with an inferior fluid distributor. Specifically, unlike the porcelain balls, porous plates are not particularly good distributors. This causes significant problems during operation of the filter. For example, fluid directed through a porous plate is more likely to pass through the central portion of the porous plate rather than be evenly distributed over the entire surface area of the porous plate. This results in mal-distribution of the fluid in the filter bed. The retrofit underdrain system disclosed in U.S. Pat. No. 6,190,568 employs multiple layers of porous plates to achieve better distribution. However, adequate distribution is not achieved owing to limitations on the distribution capabilities of the porous plate. Further, using multiple porous plates unnecessarily increases the cost of the retrofit underdrain system. The retrofit underdrain system disclosed in U.S. Pat. No. 6,190,568 is unnecessarily difficult and time consuming to install. Specifically, embedding the anchoring members in concrete to permanently secure the porous plate to the concrete bottom is a difficult and time-consuming process due in part to the presence of reinforcing steel used in the concrete. The difficulty in the installation process can lead to structural failure. Moreover, the porous plate cannot be readily replaced when necessary owing to its permanent attachment to the concrete bottom.

Porous plates of the type used in U.S. Pat. No. 6,190,568 are also subject to clogging which will significantly hamper fluid distribution through the filter media. This is particularly true in wastewater applications where gelatin-like substances can readily adhere to portions of the porous plate thereby obstructing the flow of fluid through the porous plate. This results in poor cleaning of the filter media due to mal-distribution of the washing fluid through the filter media.

OBJECTS AND SUMMARY OF THE INVENTION

An object of the present invention is to provide a novel and unobvious underdrain system.

Another object of a preferred embodiment of the present invention is to provide a method for readily retrofitting a false bottom underdrain.

A further object of a preferred embodiment of the present invention is to provide a kit for permitting an existing false bottom underdrain to be readily modified to omit the porcelain spheres while simultaneously insuring thorough distribution of the fluid through a filter bed.

Yet another object of a preferred embodiment of the present invention is to provide a new underdrain installation with a configuration that omits porcelain spheres.

Still another object of a preferred embodiment of the present invention is to provide an anchoring member for anchoring a fluid distributor to the concrete bottom of a false bottom underdrain system without penetrating any surface of the concrete bottom.

Yet still another object of a preferred embodiment of the present invention is to provide an anchoring assembly for removably anchoring a fluid distributor to the concrete bottom of a false bottom underdrain system thereby permitting rapid removal of the fluid distributor when necessary to replace the same.

Another object of a preferred embodiment of the present invention is to provide a fluid distributor that can readily support filter media thereby obviating the need for gravel support layers.

Yet a further object of a preferred embodiment of the present invention is provide a fluid distributor that is less likely to become clogged by gelatin-like substances or other substances.

Still yet another object of a preferred embodiment of the present invention is to provide a fluid distributor that thoroughly distributes washing fluid through filter media supported above the fluid distributor.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an underdrain system for a filter having filter media. The underdrain system includes a bottom formed of concrete. The bottom has a plurality of generally cone-shaped depressions formed therein. Fluid flows through the plurality of generally cone-shaped depressions during filtration and washing. The underdrain system further includes a fluid flow distribution member operably associated with at least one of the generally cone-shaped depressions. The fluid flow distribution member has a plurality of elongated slots for distributing the flow of fluid passing into and out of the generally cone-shaped depressions. The plurality of slots are sized to prevent filter media supported by the fluid flow distribution member from passing through the plurality of slots.

Another embodiment of the present invention is directed to a fluid distribution system for a filter having filter media. The fluid distribution system includes an underdrain having a bottom wall, a top wall, a first sidewall and a second sidewall. A plurality of openings are formed in the underdrain for permitting fluid to flow through at least a portion of the underdrain. The underdrain further includes a distributor for distributing the flow of fluid through a filter media disposed above the underdrain. The distributor includes a plurality of generally cylindrical members.

A further embodiment of the present invention is directed to an underdrain system for a filter having filter media. The underdrain system includes a bottom formed of concrete. The bottom has a plurality of generally cone-shaped depressions formed therein. Fluid flows through the plurality of generally cone-shaped depressions during filtration and washing. The underdrain system further includes a distributor operably associated with at least one of the generally cone-shaped depressions for distributing fluid through filter media supported above the bottom. The distributor has at least one elongated slot for distributing the flow of fluid passing into and out of the generally cone-shaped depressions. The elongated slot has a width that varies in size.

Still another embodiment of the present invention is directed to a fluid distribution system for a filter having filter media. The fluid distribution system includes an underdrain having a bottom wall, a top wall, a first sidewall and a second sidewall. A plurality of openings are formed in the underdrain for permitting fluid to flow through at least a portion of the underdrain. The underdrain further includes a distributor for distributing the flow of fluid through a filter media disposed above the underdrain. The distributor has at least one opening. The fluid distribution system includes means for changing the size of the opening in the distributor.

Yet another embodiment of the present invention is directed to a fluid distribution system for a filter having filter media. The fluid distribution system includes an underdrain having a bottom wall, a top wall, a first sidewall and a second sidewall. A plurality of openings are formed in the underdrain for permitting fluid to flow through at least a portion of the underdrain. The underdrain further includes a distributor for distributing the flow of fluid through a filter media disposed above the underdrain. The distributor has at least one elongated slot. The elongated slot is formed at least in part by a generally cylindrical member.

Yet still another embodiment of the present invention is directed to a fluid distribution system for a filter having filter media. The fluid distribution system includes an underdrain having a plurality of openings for permitting fluid to flow through at least a portion of the underdrain. The underdrain further includes a distribution assembly for distributing the flow of fluid through a filter media disposed above the underdrain. The distribution assembly includes a housing and a plurality of fluid distributors disposed in the housing. The housing has at least a first portion and a second portion. The first portion is detachably connected to the second portion for permitting removal and replacement of the plurality of distributors.

BRIEF DESCRIPTION OF THE DRAWINGS

FIG. 5 is a plan view of the lower frame member illustrated in FIGS. 1 through 4.

FIG. 6 is a cross-sectional view taken along lines 6-6 in FIG. 5.

FIG. 7 is a cross-sectional view taken along lines 7-7 in FIG. 5.

FIG. 8 is an enlarged fragmentary cross-sectional view of the lower frame member illustrated in FIG. 6.

FIG. 9 is a plan view of the upper frame member illustrated in FIGS. 1 through 4.

FIG. 10 is a side view of the upper frame member illustrated in FIG. 9.

FIG. 11 is a cross-sectional view taken along lines 11-11 in FIG. 9.

FIG. 12 is a plan view of a second preferred embodiment.

FIG. 13 is a cross-sectional view taken along lines 13-13 in FIG. 12.

FIG. 14 is a cross-sectional view taken along lines 14-14 in FIG. 12.

DETAILED DESCRIPTION OF THE PREFERRED EMBODIMENTS OF THE INVENTION

The preferred forms of the invention will now be described with reference to FIGS. 1-20. The appended claims are not limited to the preferred forms and no term and/or phrase used herein is to be given a meaning other than its ordinary meaning unless it is expressly stated that the term and/or phrase shall have a special meaning. The only term in this Specification having a special meaning is the term "insert." As used herein "insert" does not include within its meaning a porous plate, i.e., a porous plate is not an insert. The only phrase having a special meaning in this Specification is the phrase "fluid flow distribution member." As used herein the phrase "fluid flow distribution member" does not include within its meaning a nozzle, a porous plate or a sphere, i.e., a nozzle is not a fluid flow distribution member. Similarly, a sphere and a porous plate are not a fluid flow distribution member.

FIGS. 1 THROUGH 11

Figure 1:
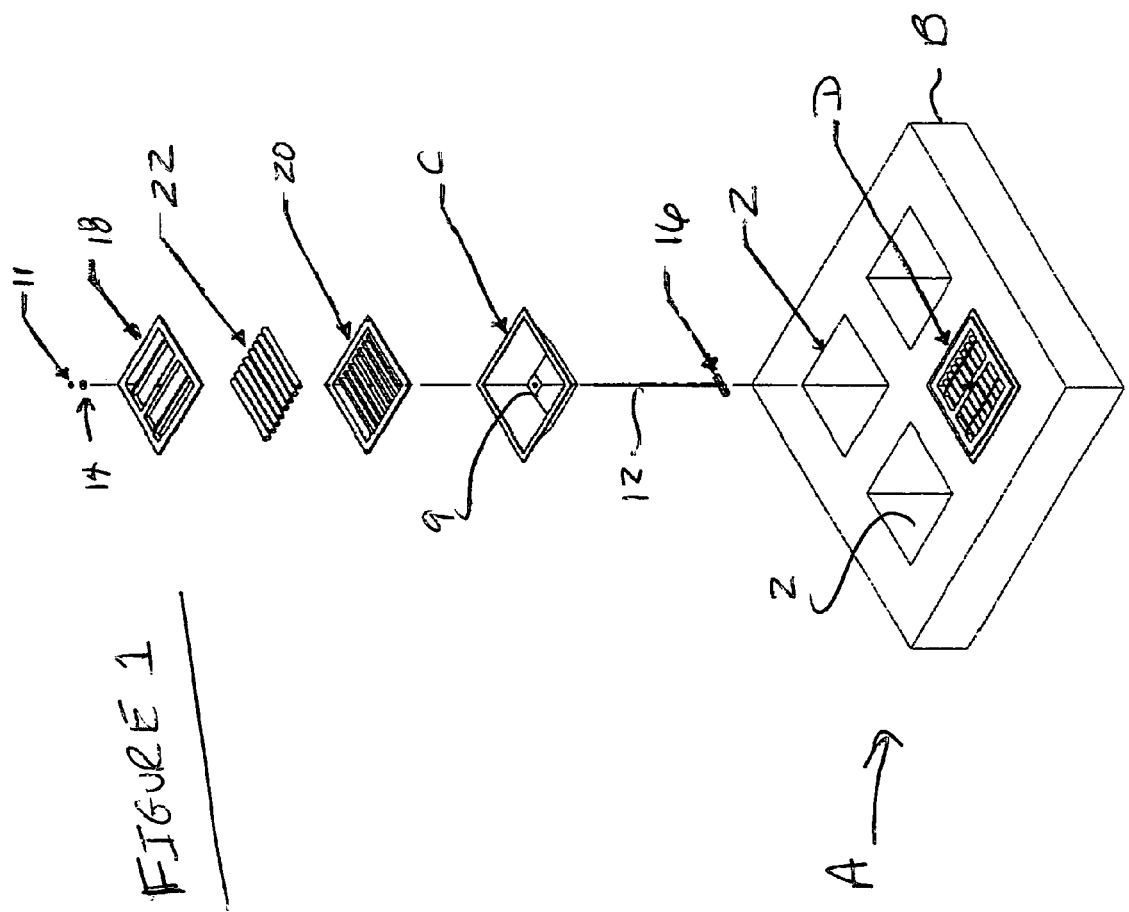
FIG. 1 is an exploded perspective view of a first preferred embodiment of the present invention.

Referring to FIG. 1, a portion of an underdrain system A is illustrated in one of many possible configurations. The underdrain system A includes a false bottom underdrain structure B. The false bottom filter underdrain structure B is preferably formed of concrete and includes a plurality of hoppers 2. The false bottom underdrain structure B can either be of the pre-cast or monolithic construction. Where the false bottom underdrain structure B is of the pre-cast type, the underdrain structure will typically include one or more underdrain blocks. The number of underdrain blocks will vary depending on the size of a given filter.

Underdrain system A preferably includes a plurality of distribution inserts C, a plurality of distribution assemblies D and a plurality of anchor assemblies E. Preferably, there is one distribution insert C, one distribution assembly D and one anchor assembly E for each hopper 2 formed in the filter underdrain structure B. Preferably, the hoppers 2 are generally cone-shaped. However, it will be readily appreciated that any suitable configuration may be used.

Figure 4:
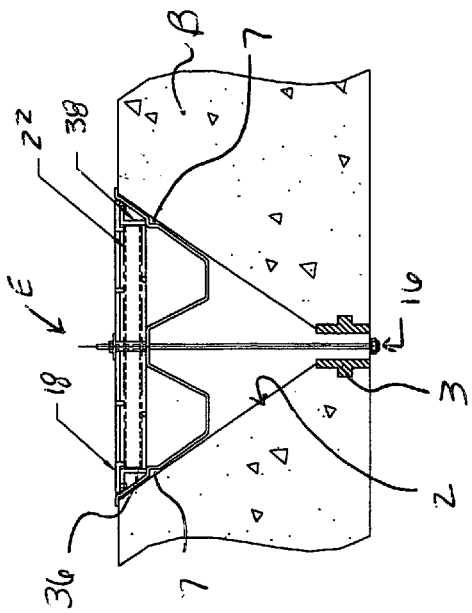
FIG. 4 is a cross-sectional view taken along lines 4-4 in FIG. 2.
Figure 3:
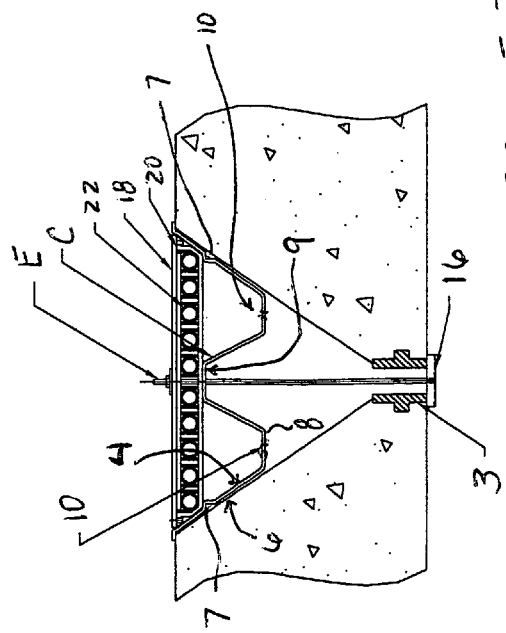
FIG. 3 is a cross-sectional view taken along lines 3-3 in FIG. 2.

Referring to FIGS. 3 and 4, a thimble 3 is disposed at the lowermost portion of each of the hoppers 2. In a retrofit application, hoppers 2 originally have a plurality of porcelain spheres (not shown) disposed therein. During the process of retrofitting the false bottom underdrain structure B, all of the porcelain spheres and support gravel are removed. It should be noted that the present invention is not limited to retrofit applications but rather encompasses original installations as well. Once the porcelain spheres are removed, the distribution inserts C are positioned in the hoppers 2 such that the exterior walls 4 of the distribution insert C engage the inner walls 6 of the hoppers 2. Exterior walls 4 may include a step 7 which assist in supporting the distribution assembly D along with the inner wall 9 of insert C. Preferably, a conventional sealant is applied to provide a fluid tight seal between the insert C and the hopper 2.

Figure 2:
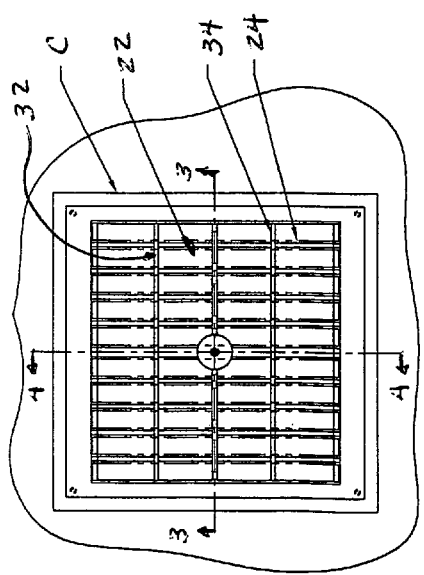
FIG. 2 is a fragmentary plan view of the embodiment depicted in FIG. 1.

Referring to FIGS. 1 to 3, distribution insert C has a lower inner wall 8 having a plurality of distribution orifices 10 formed therein. It should be noted that the distribution orifices 10 can be of any configuration including but not limited to circular. The distribution orifices 10 are spaced along the lower inner wall 8 of insert C to ensure that fluid passing through thimble 3 will be evenly distributed over the entire distribution assembly D. As such, the insert C prevents fluid from passing through only a portion of the distribution assembly D, e.g., only the center of the distribution assembly.

The anchor assembly E acts to secure the distribution assembly D and the insert C to the underdrain structure B. The anchor assembly E preferably includes a nut 11, a bolt or rod 12, a washer 14 and a retaining member 16. It will be readily appreciated that numerous other configurations may be employed for the anchor assembly E.

Referring to FIG. 3, the retaining member 16 is pivotally connected to the lower end of the bolt 12. As seen in FIG. 4, the retaining member 16 is substantially U-shaped. However, it will be readily appreciated that the configuration of the retaining member 16 may be varied as desired. The retaining member 16 preferably has a slot or other opening formed in its bottom wall to improve the flow of fluid through the thimble 3.

The lower end of the bolt or rod 12 is preferably T-shaped. The ends of the T-shaped portion of the bolt or rod 12 extend into openings in the sidewalls of the retaining member 16. This arrangement allows the retaining member 16 to pivot relative to the bolt 12 to permit the anchor assembly E, the insert C and the distribution assembly D to be readily secured to and detached from the underdrain structure B. Specifically, prior to insertion of the retaining member 16 through the bore of the thimble 3, the retaining member 16 is pivoted to a substantially vertical position. In this position, the retaining member 16 is free to pass through the bore of the thimble 3. When the retaining member 16 occupies the horizontal position depicted in FIGS. 3 and 4, the anchor assembly E acts to secure the distribution assembly D and the insert C to the underdrain structure B. To remove these elements from the underdrain structure B, the nut 11 is loosened from the bolt 12 and the bolt is lowered to allow the retaining member 16 to swing to the vertical position so that it can pass through the thimble 3.

The most preferred form of the distribution assembly D will now be described with reference made to FIGS. 1 through 11. The distribution assembly D includes an upper frame member 18, lower frame member 20, and a plurality of distribution elements 22. The upper frame member 18 and the lower frame member 20 form a housing to house the plurality of distribution members 22. Preferably, the distribution members 22 are hollow and generally cylindrical in shape. However, it will be readily appreciated that the configuration of the distribution members 22 may be varied as desired.

Referring to FIGS. 3 to 8, the lower frame member 20 includes a plurality of vertically extending internal walls 24. Lower frame member 20 further includes end walls 26 and 28. Each of the walls 24, 26 and 28 include spacers 30 extending toward the corresponding distribution members 22 to space the distribution members from the adjacent walls thereby forming a plurality of elongated slots through which fluid passes. The elongated slots are sized to prevent filter media from passing through the slots. As such, support gravel is not necessary. This allows more filter media to be used thereby prolonging the duration of the filtration cycle.

The width of the slot varies over its height due to the interrelationship of the arcuate exterior of the distribution member 22 and the adjacent wall of the lower frame member 20, i.e., the width of the slot is the narrowest at the point that the exterior of the distribution member 22 is closest to the adjacent wall. Preferably, this point is located approximately in the middle of the adjacent wall. The width of the slot is the greatest at the top and bottom of the adjacent wall as the exterior of the distribution member 22 is the furthest away from the adjacent wall. The elongated slots formed between the distribution members 22 and the adjacent walls extend substantially the entire width of the uppermost portion of the hopper 2. Preferably, the elongated slots extend at least a major portion of the width of the hopper 2 at the uppermost portion of the hopper 2. The width of the slot may be varied by varying the size of the distribution members 22, the spacers 30 and/or the width of the adjacent walls. The elongated slots ensure even distribution of fluid throughout the filter media during wash cycles. This translates into a more thorough cleaning of the filter media and, hence, longer filtration cycles. Further, the elongated slots are not as susceptible to clogging as previously known devices.

The lower frame member 20 includes two transversely extending members 32 and 34 to provide lower support for the distribution members 22. As seen in FIG. 7, the lower frame member 20 includes sidewalls 36 and 38 that prevent the distribution members 22 from moving along their longitudinal axis. Referring to FIG. 5, the lower frame member 20 includes a skirt 40 that mates with the upper frame member 18. Openings 42 are formed in each of the corners of skirt 40 to receive the corresponding pin 44 (see FIGS. 10 and 11) of the upper frame member 18 to detachably connect the upper frame member 18 to the lower frame member 20. It will be readily appreciated that pins 44 may be omitted as the anchor assembly E will serve to detachably connect the upper frame member 18 and the lower frame member 20. An opening 46 is provided in the internal wall 24 extending through the center of the lower frame member 20. The rod or bolt 12 passes through the opening 46.

Referring to FIGS. 9 through 11, the upper frame member 18 further includes five members 48 extending downwardly in the direction of the distribution members 22. Members 48 preferably abut the top of the distribution members 22 thereby preventing upward movement of distribution members 22. Member 48 passing through the center of upper frame member 18 has an opening 50 to receive bolt or rod 12. It will be readily appreciated that the number, orientation and configuration of members 48 may be varied as desired.

The insert C, distribution assembly D and anchor assembly E may be packaged and sold as a kit to facilitate repair of existing underdrain systems.

FIGS. 12 THROUGH 19

An alternative embodiment will now be described with reference to FIGS. 12 through 19. It should be noted that this embodiment is similar to the embodiment illustrated in FIGS. 1 through 11 and, therefore, only the differences will be explained in detail. Like components, in these two embodiments, have been given common reference characters to assist in the understanding of the alternative embodiment of the present invention.

The distribution assembly F includes a plurality of distribution members 52, a lower frame member 54 and an upper frame member 56. The distribution members 52 are generally cylindrical and have tapered ends to conform to the configuration of the lower frame member 54 which in turn conforms to the shape of the corresponding insert C and hopper 2. As seen in FIG. 12, spacers 58 are disposed adjacent opposite ends of the distribution members 52. Preferably, spacers 58 are annular collars that readily slide on and off the distribution members 52. Spacers 58 may be detachably secured to the distribution members 52 to permit their removal and replacement.

Figure 15:
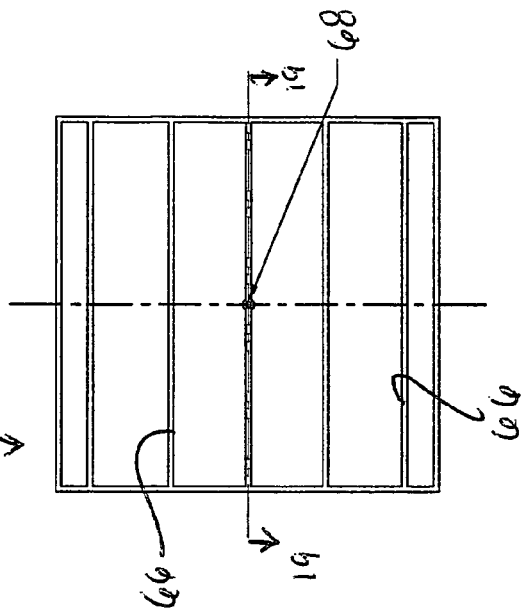
FIG. 15 is a plan view of the lower frame member illustrated in FIGS. 12 through 14.
Figure 17:
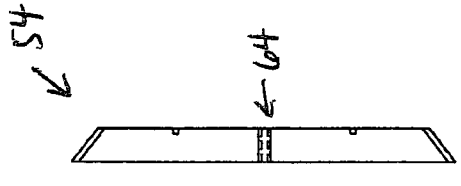
FIG. 17 is a cross-sectional view taken along lines 17-17 in FIG. 15.
Figure 16:
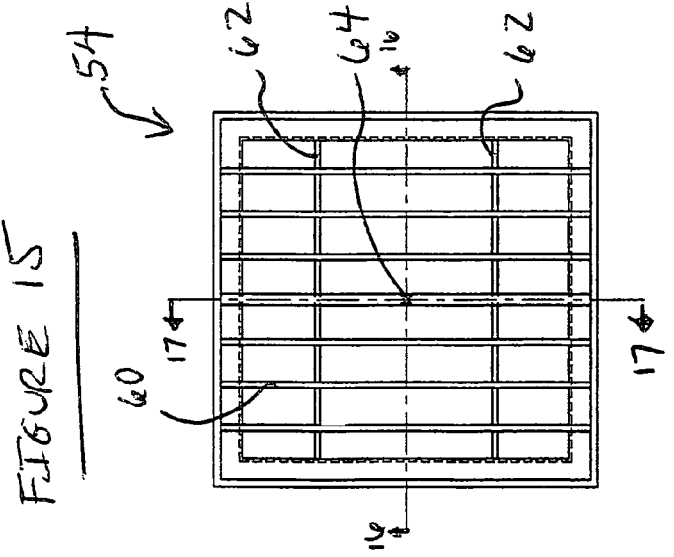
FIG. 16 is a cross-sectional view taken along lines 16-16 in FIG. 15.

As seen in FIGS. 15 and 16, the lower frame member 54 includes a plurality of spaced internal walls 60. As seen in FIG. 13, the distribution members 52 are disposed adjacent corresponding internal walls 60. Spacers 58 form elongated slots between the distribution members 52 and the corresponding internal walls 60. The elongated slots are similar to those described in connection with the embodiment depicted in FIGS. 1 through 11 and, therefore, will not be described in detail. The width of the elongated slots can be varied merely by substituting distribution members 52 and spacers 58 with similar elements of differing sizes. The lower frame member further includes transverse members 62 providing lower support for the distribution members 52. An opening 64 is formed in the internal wall 60 passing through the center of the lower frame member 54. Opening 64 receives the bolt or rod 12.

Figure 18:
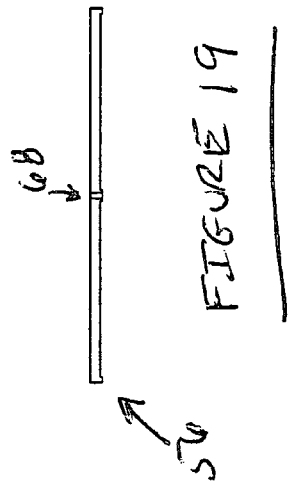
FIG. 18 is a plan view of the upper frame member illustrated in FIGS. 12 through 14.
Figure 19:
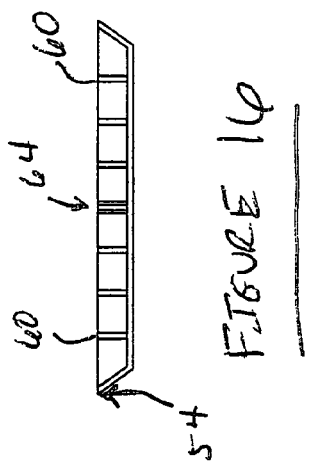
FIG. 19 is a cross-sectional view taken along lines 19-19 in FIG. 18.

As seen in FIGS. 12 and 18, upper frame member 56 includes a plurality of retaining members 66 that extend substantially perpendicular to the longitudinal axis of the distribution members 52. Retaining members 66 prevent the distribution members 52 from moving upwardly. An opening 68 is formed in the retaining member 66 passing through the center of the upper frame member 56 to receive the bolt or rod 12. The upper frame member 56 may be connected to the lower frame member 54 via only the anchor assembly E. Alternatively, the upper frame member 56 may be connected to lower frame member 54 with any known means prior to orientation on the anchor assembly E.

FIG. 20

Figure 20:
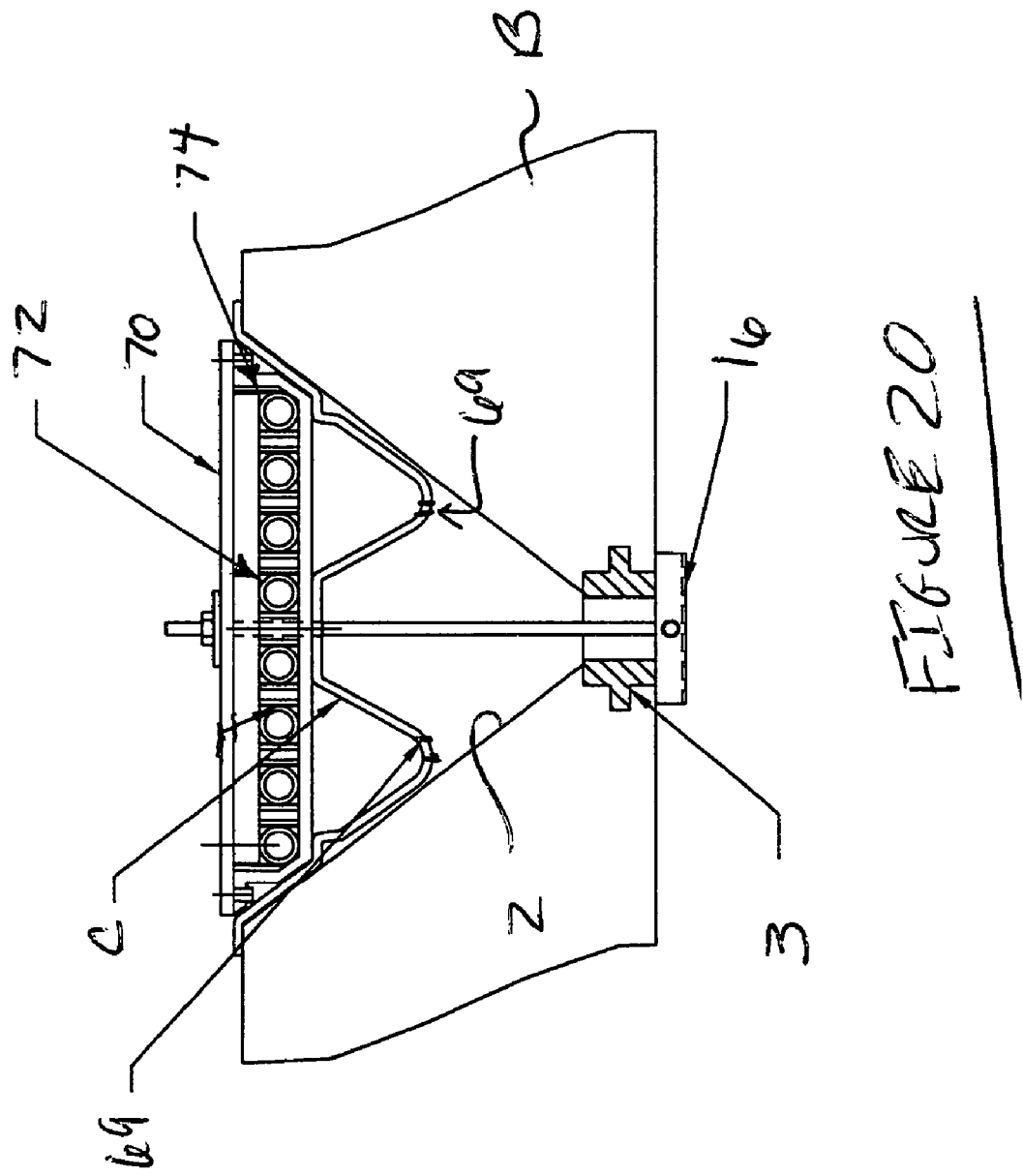
FIG. 20 is a cross-sectional view of a third preferred embodiment.

A further alternative embodiment of the present invention will now be described with reference to FIG. 20. This embodiment is similar to the embodiment illustrated in FIGS. 1 through 11. Accordingly, only the differences will be described in detail. As seen in FIG. 20, the configuration of the insert G has been modified to further assist in the distribution of fluid. The insert G includes a plurality of orifices 69. The upper frame member 70 of the distribution assembly H includes a plurality of spaced retaining members 72 (only one of which is shown) which extend downwardly a distance greater than members 48 of the first preferred embodiment. Further, the pocket of the lower frame member 74 receiving the distribution members is deeper than the pocket formed by the lower frame member 20. Accordingly, as seen in FIG. 20, the distribution members are positioned further from the top surface of upper frame member 70.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A fluid distribution system for a filter having filter media, comprising:
    (a) an underdrain having a bottom wall, a top wall, a first sidewall and a second sidewall;
    (b) a plurality of openings formed in said underdrain for permitting fluid to flow through at least a portion of said underdrain;

(c) said underdrain further including a distributor for distributing the flow of fluid through a filter media disposed above said underdrain, said distributor having at least one opening; and, (d) means for changing the size of said opening in said distributor.

2. A fluid distribution system as set forth in claim 1, wherein:

(a) said means for changing the size of said opening in said distributor includes a replacement element for replacing an existing element of said distributor, said replacement element being different from said existing element in at least one respect.

3. A fluid distribution system as set forth in claim 2, wherein:

(a) said underdrain includes a plurality of distributors, at least one distributor is operably associated with each of said plurality of openings in said underdrain, each of said plurality of distributors has a plurality of elongated slots.

4. A fluid distribution system as set forth in claim 3, wherein:

(a) said openings in said underdrain are generally cone-shaped.

5. A fluid distribution system for a filter having filter media, comprising:

(a) an underdrain having a plurality of openings for permitting fluid to flow through at least a portion of said underdrain; and, (b) said underdrain further including a distribution assembly for distributing the flow of fluid through a filter media disposed above said underdrain, said distribution assembly including a housing and a plurality of fluid distributors disposed in said housing, said housing having at least a first portion and a second portion, said first portion being detachably connected to said second portion for permitting removal and replacement of said plurality of distributors;

(c) an insert having a plurality of openings for directing fluid to and from said distribution assembly.

6. A fluid distribution system for a filter having filter media, comprising:

(a) an underdrain having a plurality of openings for permitting fluid to flow through at least a portion of said underdrain; and, (b) said underdrain further including a distribution assembly for distributing the flow of fluid through a filter media disposed above said underdrain, said distribution assembly including a housing and a plurality of fluid distributors disposed in said housing, said housing having at least a first portion and a second portion, said first portion being detachably connected to said second portion for permitting removal and replacement of said plurality of distributors;

(c) said plurality of fluid distributors include a plurality of cylindrical members; and (d) an insert having a plurality of openings for directing fluid to and from said distribution assembly.

7. A fluid distribution system as set forth in claim 6, wherein: (a) at least a portion of said distribution assembly extends into said insert.

\* \* \* \* \*